(12) United States Patent
Blank et al.

(10) Patent No.: US 6,319,964 B1
(45) Date of Patent: Nov. 20, 2001

(54) ACOUSTIC BAFFLE WITH PREDETERMINED DIRECTIONAL EXPANSION CHARACTERISTICS

(75) Inventors: Norman E. Blank, Wayne, NJ (US); Cheong Kow, Troy, MI (US)

(73) Assignee: Sika Corporation, Lyndhurst, NJ (US)

( * ) Notice: Subject to any disclaimer, the term of this patent is extended or adjusted under 35 U.S.C. 154(b) by 0 days.

(21) Appl. No.: 09/609,305

(22) Filed: Jun. 30, 2000

(51) Int. Cl.$^7$ .................................. C08F 2/46; C08J 9/10
(52) U.S. Cl. .......................... 522/42; 522/64; 522/109; 522/110; 522/129; 521/135; 521/178
(58) Field of Search ............................... 522/42, 64, 109, 522/110, 129; 521/135, 178

(56) References Cited

U.S. PATENT DOCUMENTS

| | | |
|---|---|---|
| 4,203,815 | 5/1980 | Noda et al. . |
| 5,931,474 | 8/1999 | Chang et al. . |

OTHER PUBLICATIONS

Article: "Radiation Curable Kraton D–KX222C: A Polymer for Highly Performing Hot–Melt PSA" published May/Jun. 1999 from the Radtech Report.

Article: "Weather Stabilization and Pigmentation of UV–Curable Powder Coatings" reprinted from Apr. 1999 issue of the Journal of Coatings Technology, vol. 71, No. 891, pp. 37–44.

Article: "Expanding Capabilities with UV/Visible Light Curing Adhesives" publisehd Apr. 1995 from Adhesives Age.

Article: "Photocuring of Glass–Reinforced Polyester Composites" by T. Jung, M. Koehler and D. Wostratzky.

Article: "Radiation Curing of Polymeric Materials" published 1990 by the American Chemical Society.

Article: "Ultraviolet Curing for Automotive Applications".

*Primary Examiner*—Morton Foelak
(74) *Attorney, Agent, or Firm*—Hovey, Williams, Timmons & Collins

(57) ABSTRACT

Heat-expandable molded synthetic resin seal and baffle components adapted for use in automobile body cavities or the like are provided which are designed to preferentially expand upon heating in desired directions and to a desired degree, in order to properly seal irregular or special cavity shapes. The molded components of the invention have selected body surface portions thereof UV crosslinked to a depth of up to about 0.5 mm, while other portions of the molded body are not crosslinked; upon heating, the crosslinked portions expand at a slower rate and to a lesser extent than non-crosslinked body portions. The preferred synthetic resin includes a grafted anhydride polymer, a terminal epoxide polymer additive, a blowing agent, a UV photoinitiator and a UV crosslinkable resin system.

41 Claims, No Drawings

ACOUSTIC BAFFLE WITH PREDETERMINED DIRECTIONAL EXPANSION CHARACTERISTICS

BACKGROUND OF THE INVENTION

1. Field of the Invention

The present invention relates to heat-expandable synthetic resin components used to seal and create acoustic baffles in automobile body cavities or the like, and which are prepared with a UV photoinitiator in the resin and UV crosslinking of selected surface portions thereof, so that upon heating the crosslinked surface portions will expand at a slower rate and to a lesser extent than other portions of the component. This allows predetermined directional expansion of the component rather than uniform expansion in all directions, permitting bonding of the component only to selected cavity walls and/or more efficient filling of void spaces. In preferred forms, the synthetic resin system includes a grafted anhydride polymer, an epoxide additive which reacts with the anhydride polymer upon heating, a blowing agent capable of effecting expansion when the system is heated, a UV photoinitiator and a UV crosslinkable resin system such as an acrylate resin.

2. Description of the Prior Art

Automotive vehicle bodies have a variety of hollow posts, cavities, passages and similar areas which can transmit undesirable noises, air currents, moisture, dust and other airborne particulates unless sealed to prevent infiltration of such sounds or contaminants. U.S. Pat. No. 5,373,027 describes a dry, initially non-tacky, heat expandable sealant and baffle component which may be formed into a desired shape so that upon insertion into post, cavity or passage of the vehicle body, the component will undergo heat-induced expansion when the vehicle body is conveyed through a baking oven forming a part of the primer or paint curing step of the automobile manufacturing process.

In accordance with the '027 patent, the composition for preparing the dry, expandable sealant and baffle product includes a major amount of an ethylene-α,β ethylenically unsaturated carboxylic acid copolymer which has been partially neutralized with a metallic ion such as zinc, a minor amount of a blowing agent such as a modified azodicarbonamide and a minor amount of a low molecular weight resin tackifier which has the property of imparting tackiness to the outer surface of the component when the latter is raised to an elevated temperature and thereby expanded by the blowing agent.

The dry expandable sealant and baffle composition expands within the cavity of the automobile body when it is conveyed through a conventional primer or paint bake oven. Conventional ovens for baking or curing a finish applied to an automobile body typically operate at temperatures in the range of about 140° C. to about 200° C., depending upon the coating to be dried and cured. The automobile body usually transits a particular baking oven in a time period of from about 10 to 15 minutes to as much as 2 hours. To that end, prior expandable baffle compositions have been formulated to preferably undergo expansion at a temperature of about 135° C. to about 185° C. The dry, expandable sealant composition and product of the '027 patent has enjoyed substantial commercial success throughout the automotive manufacturing field. Recent popularity of expanded-in-place sealant and baffle products for automotive applications has been accelerated by the ease of use of the baffle elements and the fact that each can be appropriately sized and configured to custom fit specific body cavity areas. Furthermore, the fact that baffle expansion can be accomplished in situ while an automobile is passing through a baking oven avoids the necessity of providing additional equipment and manufacturing operations for that specific purpose.

Most prior heat-expandable synthetic resins used in automotive cavity sealant and baffle products are designed to uniformly expand when sufficiently heated. While this characteristic is useful in many cases, there are situations where it is undesirable. For example, a given cavity geometry may have irregular contours or tight, restricted spaces which may be only incompletely filled using a uniform expansion synthetic resin system. Also, it sometimes occurs that, for optimum performance, specific cavity wall surfaces should not be contacted by the synthetic resin upon expansion thereof U.S. Pat. Nos. 5,979,902 and 5,931,474 describe cavity sealing articles made up of one or more electron beam radiation crosslinked inner synthetic resin bodies surrounded by a non-crosslinked outer shell portion. In use, the sealant article is placed within a cavity and heated, causing the crosslinked inner bodies to expand and force the outer shell portion into sealing contact with the cavity walls. The expansion characteristics of the sealing articles may be altered by selection of the shape of the inner crosslinked bodies. The sealing articles described in these patents are deficient because of the need to fully surround the inner crosslinked bodies with a shell of non-crosslinked material. This makes it more difficult to precisely control the direction and extent of heat expansion. Moreover, fabrication of sealant articles of this type can be relatively complex, particularly when plural spaced-apart inner crosslinked bodies are employed.

U.S. Pat. No. 4,203,815 discloses crosslinked and foamed resin sheets which are prepared by applying high-energy ionizing radiation to a foamed sheet to crosslink the sheet whereupon the sheet is heated for expansion purposes. Ionizing radiation permeates into the interior of the foamable sheet, so that crosslinking occurs over the entire thickness of the sheet. Accordingly, differential and/or direction-oriented expansion of the foamable material is not possible.

There is accordingly a need in the art for improved heat-expandable components adapted for use in automobile body cavities or the like which can be readily designed for controlled, direction-oriented expansion upon heating, and which avoid the use of inner crosslinked bodies surrounded by a non-crosslinked outer shell.

SUMMARY OF THE INVENTION

The present invention overcomes the problems outlined above and provides heat-expandable molded synthetic resin components which are designed to preferentially expand upon heating thereof in desired directions and to desired extents. Accordingly the components may be placed within an automobile body cavity or the like so that upon heating difficult to seal areas may be adequately filled or contacted with expanded synthetic resin material.

A component of the invention is in the form of a body presenting an outer surface and formed of a synthetic resin matrix, with at least a portion of the body surface being UV crosslinked to a depth of up to about 0.5 mm, while other body portions are not crosslinked (i.e., the other body portions are not crosslinked or are crosslinked only to a lesser extent than the primary crosslinked surface portions). Accordingly, when the component is heated to a temperature sufficient to effect expansion thereof, the UV crosslinked surface portion expands at a slower rate and to a lesser extent than the non-crosslinked body portions. In effect, the crosslinked surface portion serves as a carrier or temporary barrier section to direct the expanding synthetic resin material during the early stage of a heating cure cycle. This carrier or barrier section will normally be thermoplastic enough to slightly expand (e.g., 50–100%), while the other body portions will expand to a more significant extent.

In preferred forms, the synthetic resin matrix making up the heat-expandable component includes a quantity of a grafted anhydride polymer, an amount of a polymer additive containing a terminal epoxide group which reacts with at least a part of the anhydride polymer when the component is heated, a blowing agent, a minor amount of a photoinitiator and a crosslinkable resin system. The ingredients of the matrix are typically mixed and formed into pellets or the like, and the latter may be used in an injection molding machine to yield finished components of desired shape and size. Thereupon, one or more portions of the surface of the molded component are masked with a metal sheet or the like, and the masked component is subjected to UV light. The masked portion of the component is therefore not crosslinked or only crosslinked to a relatively minor extent, whereas the non-masked portions are crosslinked.

In use, the selectively surface crosslinked component is placed within an automobile body cavity and when the latter is passed through a curing oven as a part of the normal manufacturing process, the component is caused to expand. However, this expansion is non-uniform owing to the presence of the individual crosslinked and non-crosslinked portions of the component body.

DETAILED DESCRIPTION OF THE PREFERRED EMBODIMENT

The moldable compositions for preparation of heat-expandable components in accordance with the invention preferably include a quantity of a grafted anhydride polymer, and an amount of a polymer additive containing a terminal epoxide group which reacts with at least a part of the anhydride polymer when the component is heated sufficiently for expanding the compositions (e.g., to a temperature experienced by an automobile body during the paint or powder bake stage of the manufacturing process). In addition, the moldable compositions include a suitable blowing agent which effects expansion of the molded component when the component is heated. Desirably, the moldable composition also includes a tackifier which imparts tackiness to the outer surface of the dry, initially non-tacky, molded component as it expands when subjected to bake oven heat. The grafted anhydride polymer present in the component, which functions somewhat in the manner of an adhesive when heated in the bake oven, increases the tackiness properties of the molded component as it undergoes expansion.

Exemplary grafted anhydride polymers useful in preparing the improved compositions include ethylene-vinyl acetate grafted with an acid anhydride functionally, ethylene-n-butyl acrylate grafted with an acid anhydride functionally, ethylene-octane copolymer grafted with an acid anhydride functionally, polyethylene grafted with an acid anhydride functionally, polypropylene grafted with an acid anhydride functionally, and ethylene-propylene rubber grafted with an acid anhydride functionally. A preferred acid anhydride in each instance is maleic anhydride. A preferred olefinic grafted polymer is ethylene-vinyl acetate grafted with maleic anhydride functionally. The grafted olefinic anhydride polymer is preferably present in the composition on a wt % basis of from about 10 to about 60%.

The polymer additive containing a terminal epoxide group is preferably selected from the group of solid Bisphenol A or F diglycidyl ether polymer (derived from Bisphenol A or Bisphenol F and epichlorohydrin) characterized by an epoxide equivalent>about 400, liquid Bisphenol A or F diglycidyl ether polymer (derived from Bisphenol A or Bisphenol F and epichlorohydrin) characterized by an epoxide equivalent of about 150 to about 220, adducts of dimer fatty acids with diglycidyether of Bisphenol A or Bisphenol F (Epikote or Epon 872), and adducts of epoxide terminated acrylonitrile-butadiene rubbers (CTBN, Hycar 1300×8, 1300×13). A preferred additive is Bisphenol A diglycidyl ether polymer. The epoxide terminated polymer additive is preferably present in the composition on a wt % basis of from about 1 to about 10%.

The blowing agent is preferably selected from the group of a modified or unmodified azodicarbonamide, p,p'-oxybis (benzene-sulfonyl) hydrazide, p-toluene sulfonyl hydrazide, and dinitroso pentamethylene tertamine. The preferred blowing agent is an azodicarbonamide. The blowing agent is preferably present in the composition on a wt % basis of from about 1 to about 10%.

The compositions may also include a filler polymer which is preferably selected from the group of ethylene-vinyl acetate, ethylene-n-butyl acrylate, ethylene-octane copolymer, polyethylene, polypropylene, and ethylene methacrylic acid copolymer. The preferred filler polymer is ethylene-vinyl acetate. The filler polymer when incorporated in the composition may be present on a wt % basis of from about 1 to about 50%.

A rubber-like constituent may also be included in the compositions for preparing the expandable components, and is preferably selected from the group of styrene-butadiene rubber, ethylene-propylene rubber, ethylene-propylene-diene rubber, butadiene rubber, styrene isoprene-styrene block copolymer, styrene-butadiene-styrene block copolymer, styrene-ethylene/butylene-styrene block copolymer, styrene-ethylene/propylene block copolymer, nitrile rubber, and chlorinated polyethylene. The preferred rubber-like constituent is styrene-butadiene rubber. The rubber-like constituent may be present in the composition on a wt % basis of from about 1 to about 15%.

A molding and processing aid may be included in the compositions and is preferably selected from the group of paraffin wax, microcrystalline wax, polyethylene wax, polyamide wax, and natural wax. The preferred molding and processing aid when used in the compositions is polyethylene wax. The amount of the molding and processing aid on a wt % basis may be from about 1 to about 15%.

A tackifier for enhancing the tackiness of the expandable component following initiation of expansion thereof may be incorporated in the moldable compositions. The tackifier when used is preferably selected from the group of aliphatic hydrocarbon resins, aromatic hydrocarbon resins, aliphatic/aromatic hydrocarbon resins, hydrogenated hydrocarbon resins, polyterpene resins, rosin ester resins, coumarone indene resins, α-methyl styrene resins, and polystyrene resins. The major proportion of the aliphatic hydrocarbon resins and of the aromatic hydrocarbon resins preferably are principally made up of $C_5$, $C_7$, and $C_9$ hydrocarbons in the case of the aliphatic hydrocarbon resins and equivalent hydrocarbons in the aromatic hydrocarbon resins. The amount of tackifier on a wt % basis may be from about 1 to about 15%.

An inorganic or organic filler may be included in the compositions in an amount ranging on a wt % basis from about 1 to about 20%, and preferably is selected from the group of calcium carbonate, barium sulfate, silica, calcium sulfate, aluminum silicate, magnesium silicate, potassium aluminum silicate, calcium metasilicate, pumice, glass spheres, and organic fillers. The preferred filler is calcium carbonate. The amount of inorganic or organic filler on wt % basis may be from about 1 to about 20%.

The compositions of the invention also include a photoinitiator and reactive resin system which permits surface UV crosslinking. The photoinitiator is generally present at a level of up to about 2% by weight, more preferably from about 0.01–0.1% by weight, and most preferably from about 0.05–0.1% by weight, wherein all weights are based upon the total weight of the composition taken as 100% by weight. The photoinitiator is preferably selected from the group consisting of 1-hydroxy cyclohexyl-phenyl ketone and phenylbis(2,4,6)-trimethylbenzyl phosphin oxide. The reactive resin system is typically an acrylate resin, such as an aliphatic polyester acrylate resin having a viscosity of 30,000 cps at 60° C. (e.g., Genomer 4262, Rahn AG) or a modified vinylester acrylate resin having a viscosity of 45,000 cps at 25° C. (e.g., Geomer 2254, Rahn AG). The reactive resin system is present at a level of from about 1–10% by weight, more preferably from about 4–10% by weight, based upon the total weight of the component taken as 100% by weight.

The compositions hereof may be prepared by introducing the individual constituents into a conventional extruding machine. Exemplary machines include single screw compounding equipment, reciprocating single screw extruding machines, and twin screw extruding machines. Extrusion equipment of this type conventionally includes from two to four inlets along the length thereof with the ratio of the length of the barrel to the diameter of the screw being in the range of about 7:1 to about 18:1. Preferably, all of the constituents of the composition except for the reactive and blowing agents are added at the first entrance port to the extruder. The reactive and blowing agents and the photoinitiator are added at the third port of the extruder where the extruding equipment has four conventional entrance ports. The third port is normally about 50% to about 75% away from the first entrance port along the length of the extruder barrel. Residence time normally is in the range of from about 1–3 minutes with a nominal processing time being about 2 minutes.

The continuous extruder should be equipped with a knife capable of cutting the extrudate into a series of pellets. If desired, the extrudate exiting from the extruder can be subjected to a water bath to assure cooling thereof to a substantially solid form. Alternatively, the extrudate from the continuous extruder can be directed as a strand to a strand pelletizer and cut into small pellet cylinders.

The pellets from the extruder can then be molded into a composite, expandable sealant and baffle component in an injection molding machine, preferably at a temperature in the range of 80° C. to 100° C., and usually no more than about 120° C. Virtually any desired three-dimensional shape can be obtained in this manner.

It has also been surprisingly found that the base polymer forming the acoustic product can be compounded as described above, with subsequent injection molding to a desired shape. After molding, the body is completed by applying to the surface thereof UV-curable materials, e.g., a photoinitiator and a reactive resin system. These materials may be applied to the formed body by spraying or brushing.

Subsequent to preparation of the heat-expandable component, it is subjected to selective surface crosslinking. That is, selected surface portions are UV crosslinked using an appropriate UV light, such as that generated by arc-type medium pressure mercury lamps, high-pressure xenon lamps and excimer lasers. The wavelength of the UV light is preferably from about 220–450 nm, more preferably from about 230–430 nm. Particularly preferred are medium pressure mercury lamps having an energy density of from about 200–250 watts/cm. Exposure times are preferably from about 10–300 seconds, more preferably from about 10–50 seconds, in an exposure tunnel. In order to crosslink only selected portions of the component surface, metal or other UV adsorbing shields are strategically placed about the molded component during travel through the UV tunnel. Thus, if a bottom surface of a molded component is covered during UV crosslinking, that bottom surface will not be crosslinked to any appreciable extent; therefore the component upon expansion will be less constrained at the bottom surface and expansion will occur through the bottom surface to a greater extent than through the upper surface crosslinked portions of the component.

Although the improved expandable baffle components of this invention have been described particularly utility for use in the passage defining cavities of automobile bodies, it is to be understood that the expandable component offers advantages when used in other products that are subjected to manufacturing and/or processing applications which raise the temperature of that product. For example, many appliances have structural supporting members presenting passages which would benefit from incorporation of a sealant and baffle element in the structure defining the passages to prevent entrance into or passage through the passages of undesirable contaminants. Furthermore, many of these appliances have paint or coating materials applied which are dried and/or cured in a baking oven. Refrigerators are just one example of an appliance which advantageously could be provided with improved sealant and baffle components of this invention in certain supporting structures of the appliance.

The following table sets forth the makeup of preferred compositions in accordance with the invention, exclusive of the added UV photoinitiator. That is, a desired amount of a photoinitiator as described above may be added to each of the following compositions in order to produce molded components which may be selectively surface crosslinked over portions of the outer surface thereof.

| Expandable Baffle Composition | #1 | #2 |
|---|---|---|
| Bynel CXA-E418 | | |
| Elvax 265 | | |
| SBR | | |
| Tyrin 2136P | | |
| Nevtac 100 | | |
| Microsere 5999 | | |
| Marcus M200 | | |
| Epon 1001F | | |
| Arldite GT 9654 | | |
| Celogen 765A | | |
| Unicell DL75N | | |
| Unicell OH | | |
| Unicell GP3 | | |
| ZnO | | |
| Polar 9910 | | |
| Quincy White 325 | | |
| Irgacure 184 | | |
| Irgacure 819 | | |
| Genomer 4246 | | |
| Genomer 2254 | | |

-continued

| Expandable Baffle Composition | #1 | #2 |
|---|---|---|
| Total | 100% | 100% |

Bynel CXA-E418 - ethylene-vinyl acetate grafted with maleic anhydride functionally
Elvax 265 - ethylene-vinyl acetate
SBR - styrene-butadiene rubber
Tyrin 2136P - chlorinated polyethylene
Nevtac 100 - aliphatic hydrocarbon resin ($C_5$, $C_7$ and $C_9$)
Microsere 5999 - microcrystalline wax
Marcus M200 - polyethylene wax
Epon 1001F - Bisphenol A diglycidyl ether polymer
Arldite GT 9654 - Bisphenol A diglycidyl ether polymer
Celogen 765A - modified azodicarbonamide
Unicell DL75N - modified azodicarbonamide
Unicell OH - p,p'-oxybis(benzene-sulfonyl) hydrazide
Unicell GP3 - dinitroso pentamethylene tertamine
ZnO - zinc oxide
Polar 9910 - potassium-aluminum silicate
Quincy White 325 - calcium carbonate The UV crosslinkable compositions of the invention are similar (except for the provision of the photoinitiator and crosslinkable resin ingredients) to those described in pending application for U.S. Letters Patent Ser. No. 09/407,820 filed Sep. 28, 1999, and incorporated by reference herein.

We claim:

1. A method of preparing a heat-expandable component, said method comprising the steps of:

forming a body presenting an outer surface, said body comprising a synthetic resin matrix including a quantity of a grafted anhydride polymer, an amount of a polymer additive containing a terminal epoxide group which reacts with at least a part of the anhydride polymer when the component is heated to effect expansion thereof, and a sufficient quantity of a blowing agent capable of expanding the component upon heating thereof, at least a portion of said body surface including a UV photoinitiator and a crosslinkable synthetic resin; and subjecting some of said body portion to UV radiation to crosslink said matrix to a depth of up to about 0.5 mm so that, when the component is sufficiently heated to effect expansion thereof, said UV crosslinked portion expands at a lower rate and to a lesser extent than other portions of said body.

2. The method of claim 1, said forming step comprising the step of conveying a mixture of said grafted anhydride polymer, said polymer additive, said blowing agent and said photoinitiator through a continuous mixing zone and thereafter forming said body.

3. The method of claim 2, wherein is included the step of conveying the admixture through an auger-type continuous mixer.

4. The method of claim 2, wherein is included the step of conveying the admixture through said continuous mixing zone under conditions causing the admixture to remain substantially liquid and at the temperature thereof at the time of introduction into the zone.

5. The method of claim 2, wherein is included the step of conveying the admixture through said continuous mixing zone for a time period from about 1 to about 2 minutes.

6. The method of claim 1, said component being a sealant and baffle component configured for sealing an automobile body cavity.

7. The method of claim 1, said UV crosslinked depth being from about 0.1–0.3 mm.

8. The method of claim 7, said UV crosslinked depth being from about 0.1–0.2 mm.

9. The method of claim 1, wherein said polymer comprises a grafted olefinic-based composition and an anhydride reacted with at least part of the olefinic-based composition.

10. The method of claim 9, wherein said grafted olefinic-based composition is selected from the group consisting of ethylene-vinyl acetate, ethylene-n-butyl acrylate, ethylene-octane copolymer, polyethylene, polypropylene, and ethylene-propylene rubber.

11. The method of claim 9, wherein said anhydride is maleic anhydride.

12. The method of claim 1, wherein said blowing agent is selected from the group consisting of modified and unmodified azodicarbonamide.

13. The method of claim 12, wherein said blowing agent is selected from the group consisting of p,p'-oxybis (benzene-sulfonyl) hydrazide, p-toluene sulfonyl hydrazide, and dinitroso pentamethylene tertamine.

14. The method of claim 1, wherein said grafted anhydride polymer is present within the range of about 10 to about 60 wt % of said component.

15. The method of claim 1, wherein said polymer additive is present within the range of about 1 to about 10 wt % of said component.

16. The method of claim 1, wherein said blowing agent is present within the range of about 1 to about 10 wt % of said component.

17. The method of claim 1, wherein is included a quantity of a olefinic-based polymer.

18. The method of claim 17, wherein said olefinic-based polymer is selected from the group consisting of ethylene-vinyl acetate, ethylene-n-butyl acrylate, ethylene-octane copolymer, polyethylene, polypropylene, and ethylene methacrylic acid copolymer.

19. The method of claim 17, wherein said olefinic-based polymer is present in an amount within the range of about 1 to about 50 wt % of the component.

20. The method of claim 1, wherein is included a quantity of a synthetic rubber-like material.

21. The method of claim 20, wherein said synthetic rubber-like material is selected from the group consisting of a styrene-butadiene rubber, ethylene-propylene rubber, ethylene-propylene-diene rubber, butadiene rubber, styrene isoprene-styrene block copolymer, styrene-butadiene-styrene block copolymer, styrene-ethylene/butylene-styrene block copolymer, styrene-ethylene/propylene block copolymer, nitrile rubber, and chlorinated polyethylene.

22. The method of claim 20, wherein said rubber-like material is present in amount of from about 1 to about 15 wt % of the component.

23. The method of claim 1, wherein said component includes an aliphatic hydrocarbon resin.

24. The method of claim 1, wherein is included an additive selected from the group of aliphatic hydrocarbon resins, aromatic hydrocarbon resins, aliphatic/aromatic hydrocarbon resins, hydrogenated hydrocarbon resins, polyterpene resins, rosin ester resins, coumarone indene resins, α-methyl styrene resins, and polystyrene resins.

25. The method of claim 24, wherein said aliphatic hydrocarbon resin is principally made up of $C_5$, $C_7$ and $C_9$ hydrocarbons.

26. The method of claim 1, wherein said polymer additive is selected from the group consisting of Bisphenol A diglycidyl ether polymer, Bisphenol F diglycidyl ether polymer, adducts of dimer fatty acids with diglycidyether of Bisphenol A, adducts of dimer fatty acids with diglycidyether of Bisphenol F, and adducts of epoxide terminated acrylo-butadiene-nitrol rubbers.

27. The method of claim 1, wherein said component includes a quantity a wax product.

28. The method of claim 27, wherein said wax product is selected from a group consisting of paraffin wax, microcrystalline wax, polyethylene wax, polyamide wax, and natural wax.

29. The method of claim 27, wherein said wax product is present in an amount of from about 1 to about 15 wt % of the component.

30. The method of claim 1, wherein said component includes a filler.

31. The method of claim 30, wherein said filler is selected from the group consisting of calcium carbonate, barium sulfate, silica, calcium sulfate, aluminum silicate, magnesium silicate, potassium aluminum silicate, calcium metasilicate, pumice, glass spheres, and organic fillers.

32. The method of claim 30, wherein said filler is present in an amount of from about 1 to about 20 wt % of the component.

33. The method of claim 1, said photoinitiator being present at a level of up to about 2% by weight, based upon the weight of the matrix taken as 100%.

34. The method of claim 33, said level being from about 0.01–0.1% by weight.

35. The method of claim 34, said level being from about 0.05–0.1% by weight.

36. The method of claim 1, said photoinitiator selected from the group consisting of 1-hydroxy cyclohexylphenyl ketone and phenylbis(2,4,6)-trimethylbenzyl phosphin oxide.

37. The method of claim 1, wherein said subjecting step comprises exposing said body to light having a wavelength of from about 220–450 nm.

38. The method of claim 37, said exposing step being carried out for a period of from about 10–300 seconds.

39. The method of claim 1, said crosslinkable resin being an acrylate resin.

40. The method of claim 39, said crosslinkable resin being present at a level of from about 1–10% by weight, based upon the total weight of said matrix taken as 100% by weight.

41. The method of claim 1, including the step of forming a portion of said body, and applying to the surface of said body portion a UV photoinitiator and a crosslinkable synthetic resin to form said body.

* * * * *